(12) United States Patent
Kwon et al.

(10) Patent No.: US 9,711,800 B2
(45) Date of Patent: Jul. 18, 2017

(54) CABLE-TYPE SECONDARY BATTERY

(71) Applicant: LG Chem, Ltd., Seoul (KR)

(72) Inventors: Yo-Han Kwon, Daejeon (KR);
Byung-Hun Oh, Daejeon (KR);
Je-Young Kim, Daejeon (KR);
Sang-Wook Woo, Daejeon (KR)

(73) Assignee: LG Chem, Ltd. (KR)

( * ) Notice: Subject to any disclaimer, the term of this patent is extended or adjusted under 35 U.S.C. 154(b) by 14 days.

(21) Appl. No.: 14/897,448

(22) PCT Filed: Nov. 27, 2014

(86) PCT No.: PCT/KR2014/011503
§ 371 (c)(1),
(2) Date: Dec. 10, 2015

(87) PCT Pub. No.: WO2015/080499
PCT Pub. Date: Jun. 4, 2015

(65) Prior Publication Data
US 2016/0133942 A1    May 12, 2016

(30) Foreign Application Priority Data

Nov. 27, 2013 (KR) .......................... 10-2013-0145427
Nov. 27, 2014 (KR) .......................... 10-2014-0167543

(51) Int. Cl.
*H01M 4/66* (2006.01)
*H01M 4/75* (2006.01)
(Continued)

(52) U.S. Cl.
CPC ............... *H01M 4/75* (2013.01); *H01M 2/18* (2013.01); *H01M 10/052* (2013.01);
(Continued)

(58) Field of Classification Search
CPC ...... H01M 4/75; H01M 10/0525; H01M 2/18; H01M 10/052; H01M 10/058; H01M 4/78; H01M 4/13; Y02T 10/7011
See application file for complete search history.

(56) References Cited

U.S. PATENT DOCUMENTS 6,503,661 B1 * 1/2003 Park ................. H01M 10/0565
252/62.2
2004/0265699 A1    12/2004 Choi et al.
(Continued)

FOREIGN PATENT DOCUMENTS

CN            1526177 A       9/2004
JP          2012238469 A      12/2012
(Continued)

OTHER PUBLICATIONS

International Search Report for Application No. PCT/KR2014/011503 dated Mar. 11, 2015.

*Primary Examiner* — Cynthia K Walls
(74) *Attorney, Agent, or Firm* — Lerner, David, Littenberg, Krumholz & Mentlik, LLP

(57) ABSTRACT

Disclosed is a cable-type secondary battery including an inner electrode including an inner current collector and an inner electrode active material layer formed surrounding an outer surface of the inner current collector, a separation layer formed surrounding an outer surface of the inner electrode to insert the inner electrode inside, an outer electrode active material structure formed surrounding an outer surface of the separation layer to insert the separation layer inside, the outer electrode active material structure including a porous polymer support and an outer electrode active material layer formed on at least one of an upper surface and a lower surface of the porous polymer support, and an outer electrode including an outer current collector formed surround-
(Continued)

ing the outer electrode active material structure to insert the outer electrode active material structure inside.

29 Claims, 10 Drawing Sheets

(51) Int. Cl.
- *H01M 2/18* (2006.01)
- *H01M 10/052* (2010.01)
- *H01M 10/058* (2010.01)
- *H01M 10/0525* (2010.01)
- *H01M 4/13* (2010.01)
- *H01M 4/78* (2006.01)

(52) U.S. Cl.
CPC ..... *H01M 10/058* (2013.01); *H01M 10/0525* (2013.01); *H01M 4/13* (2013.01); *H01M 4/78* (2013.01); *Y02T 10/7011* (2013.01)

(56) References Cited

U.S. PATENT DOCUMENTS

| | | |
|---|---|---|
| 2005/0084760 A1 | 4/2005 | Hwang et al. |
| 2010/0203372 A1 | 8/2010 | Kim et al. |
| 2014/0011065 A1 | 1/2014 | Kwon et al. |
| 2014/0170456 A1 | 6/2014 | Kwon et al. |
| 2014/0178726 A1 | 6/2014 | Kwon et al. |
| 2014/0186672 A1 | 7/2014 | Kwon et al. |
| 2014/0212719 A1 | 7/2014 | Kwon et al. |

FOREIGN PATENT DOCUMENTS

| | | |
|---|---|---|
| KR | 20050030438 A | 3/2005 |
| KR | 100742739 B1 | 7/2007 |
| KR | 100804411 B1 | 2/2008 |
| KR | 20090009598 A | 1/2009 |
| KR | 20130040160 A | 4/2013 |
| KR | 20130040161 A | 4/2013 |
| KR | 20130040166 A | 4/2013 |
| KR | 20130045218 A | 5/2013 |
| KR | 20130045219 A | 5/2013 |

\* cited by examiner

COMPARATIVE EXAMPLE

CABLE-TYPE SECONDARY BATTERY

CROSS-REFERENCE TO RELATED APPLICATION

This application is a national phase entry under 35 U.S.C. §371 of International Application No. PCT/KR2014/011503, filed Nov. 27, 2014, which claims priority to Korean Patent Application No. 10-2013-0145427, filed Nov. 27, 2013 and Korean Patent Application No. 10-2014-0167543, filed Nov. 27, 2014, the disclosures of which are incorporated herein by reference.

TECHNICAL FIELD

The present disclosure relates to a cable-type secondary battery, and more particularly, to a cable-type secondary battery including an external electrode active material structure using a porous polymer support with flexibility.

BACKGROUND ART

A secondary battery is a device that stores electrical energy in chemical form and converts the stored chemical energy into electrical energy to generate electricity when needed. The secondary battery is also referred to as a rechargeable battery because it can be recharged repeatedly. A common secondary battery includes a lead accumulator, a NiCd battery, a NiMH accumulator, a Li-ion battery, and a Li-ion polymer battery. When compared to a disposable primary battery, not only is the secondary battery more economically efficient, it is also more environmentally friendly.

A secondary battery is currently used in applications requiring low electric power, for example, equipment to assist in starting a vehicle, a mobile device, a tool, and an uninterruptible power supply. Recently, as the development of wireless communication technologies is leading to the popularization of mobile devices and there is a movement toward the mobilization of many types of existing devices, the demand for a secondary battery is dramatically increasing. Also, in the aspect of preventing environmental pollution, a hybrid vehicle and an electric vehicle have been developed, and these next-generation vehicles are employing technology for reducing the cost and weight and increasing the service life using a secondary battery.

Generally, most secondary batteries have a cylindrical, prismatic, or pouch shape. This is associated with a fabrication process of a secondary battery that mounts an electrode assembly composed of a negative electrode, a positive electrode, and a separator in a cylindrical or prismatic metal can or a pouch-shaped case of an aluminum laminate sheet, and injects an electrolyte into the electrode assembly. Because a predetermined space for mounting a secondary battery is necessary, a cylindrical, prismatic or pouch shape of a secondary battery is a limitation in developing portable devices of various shapes. Accordingly, there is a need for a new type of secondary battery that is easily adaptable in shape.

To fulfill this need, suggestions have been made to develop a linear battery having a very high ratio of length to cross-sectional diameter. Korean Patent No. 0804411 discloses a linear battery including a plurality of negative and positive electrodes with separators interposed between the negative and positive electrodes, and Korean Patent No. 0742739 discloses an adaptable battery including positive electrode threads and negative electrode threads in the shape of a thread, but they have poor flexibility. Also, when deformation takes place in an outer current collector of a cable-type secondary battery by the outside force, a short circuit may occur by the contact with an inner current collector.

Also, in the manufacture of a linear battery, when a negative electrode and a separator are produced and a positive electrode is then coated on the electrode, inner coating layers of the separator and the negative electrode melt and ooze by an organic solvent included in a positive electrode slurry.

Also, in the manufacture of a general battery, when producing a positive electrode on a plane, an operation of compressing the electrode to a predetermined level is needed. This is to improve electric contacts between a positive active material/a conductive material/a current collector through the compression operation because the positive active material has low conductivity. However, in the case of a linear battery, according to its shape, because it is very difficult to perform an electrode compression operation after coating a positive electrode, an electric contact of an electrode gets loose, causing deterioration in life span of the battery.

DISCLOSURE

Technical Problem

The present disclosure is directed to providing a secondary battery of a new linear structure, which is easily shape-adaptable, maintains stability and good performance of the secondary battery, eliminates or reduces a risk of a short circuit caused by deformation of an outer current collector, improves life characteristics through electric contact enhancement, increases procedural efficiency in the battery fabrication, and facilitates fault management.

Technical Solution

To achieve the above object, according to one aspect of the present disclosure, there is provided a cable-type secondary battery including an inner electrode including an inner current collector and an inner electrode active material layer formed surrounding an outer surface of the inner current collector, a separation layer formed surrounding an outer surface of the inner electrode to insert the inner electrode inside, an outer electrode active material structure formed surrounding an outer surface of the separation layer to insert the separation layer inside, the outer electrode active material structure including a porous polymer support and an outer electrode active material layer formed on at least one of an upper surface and a lower surface of the porous polymer support, and an outer electrode including an outer current collector formed surrounding the outer electrode active material structure to insert the outer electrode active material structure inside.

The inner current collector is a wire-type current collector or a current collector of an open structure.

The current collector of an open structure may be a hollow current collector having a space formed therein, or a mesh-type current collector.

The hollow current collector may include at least one wire-type inner current collector wound in a spiral pattern, or at least one sheet-type inner current collector wound in a spiral pattern.

The hollow current collector may include at least two wire-type inner current collectors wound in a spiral pattern such that the wire-type inner current collectors intersect.

The space formed in the hollow current collector may have an inner electrode current collector core, a lithium ion supply core including an electrolyte, or a filling core formed therein.

The inner electrode current collector core may be made from carbon nanotube; stainless steel; aluminum; nickel; titanium; baked carbon; copper; stainless steel surface-treated with carbon, nickel, titanium or silver; an aluminum-cadmium alloy; a non-conductive polymer surface-treated with a conductive material; or a conductive polymer.

The lithium ion supply core may include a gel polymer electrolyte and a support.

The lithium ion supply core may include a liquid polymer electrolyte and a porous carrier.

The electrolyte may include an electrolyte selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN or PVAc; and a solid electrolyte using PEO, polypropylene oxide (PPO), polyethylene imine (PEI), polyethylene sulphide (PES), or polyvinyl acetate (PVAc).

The electrolyte may further include a lithium salt.

The lithium salt may be any one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate, or mixtures thereof.

The filling core may include a polymer resin, rubber, or inorganic matters in a shape of a wire, a fiber, powder, a mesh, or a foam.

The inner current collector may be made from stainless steel; aluminum; nickel; titanium; baked carbon; copper; stainless steel surface-treated with carbon, nickel, titanium or silver; an aluminum-cadmium alloy; a non-conductive polymer surface-treated with a conductive material; or a conductive polymer.

The conductive material may be any one selected from polyacetylene, polyaniline, polypyrrole, polythiophene, polysulfurnitride, indium tin oxide (ITO), silver, palladium, and nickel, or mixtures thereof.

The conductive polymer may be a polymer of any one compound selected from polyacetylene, polyaniline, polypyrrole, polythiophene, and polysulfurnitride, or mixtures thereof.

The porous polymer support may be a porous substrate or non-woven fabric made from a polymer selected from the group consisting of polyolefin, polyester, polyacetal, polyamide, polycarbonate, polyimide, polyether ether ketone, polyether sulfone, polyphenylene oxide, polyphenylene sulfide, and polyethylene naphthalate.

The porous substrate may be a porous woven structure woven by interlacing warp and weft while the weft passes over and under the warp, each of the warp and the weft having an average diameter of from 10 μm to 200 μm.

The porous polymer support may be wound on the outer surface of the separation layer in a diagonal direction, or is wound on the outer surface of the separation layer at a time in a form of a pipe.

The outer current collector may be a pipe-type current collector, a wound wire-type current collector, a wound sheet-type current collector, or a mesh-type current collector.

The outer current collector may be made from stainless steel; aluminum; nickel; titanium; baked carbon; copper; stainless steel surface-treated with carbon, nickel, titanium or silver; an aluminum-cadmium alloy; a non-conductive polymer surface-treated with a conductive material; a conductive polymer; a metal paste comprising metal powder of Ni, Al, Au, Ag, Al, Pd/Ag, Cr, Ta, Cu, Ba or ITO; or a carbon paste comprising carbon powder of graphite, carbon black or carbon nanotube.

The inner electrode may be a negative electrode or a positive electrode, and the outer electrode may be a positive electrode or a negative electrode, opposite to the inner electrode.

The separation layer may be an electrolyte layer or a separator.

The electrolyte layer may include a gel polymer electrolyte using PEO, PVdF, PVdF-HFP, PMMA, PAN or PVAC; and a solid electrolyte using PEO, polypropylene oxide (PPO), polyethylene imine (PEI), polyethylene sulphide (PES), or polyvinyl acetate (PVAc).

The electrolyte layer may further include a lithium salt.

According to another aspect of the present disclosure, there is provided a cable-type secondary battery including at least two inner electrodes arranged parallel to each other, each inner electrode comprising an inner current collector and an inner electrode active material layer formed surrounding an outer surface of the inner current collector, a separation layer formed surrounding outer surfaces of the at least two inner electrodes to insert the inner electrodes inside, an outer electrode active material structure formed surrounding an outer surface of the separation layer to insert the separation layer inside, the outer electrode active material structure comprising a porous polymer support and an outer electrode active material layer formed on at least one of an upper surface and a lower surface of the porous polymer support, and an outer electrode comprising an outer current collector formed surrounding the outer electrode active material structure to insert the outer electrode active material structure inside.

Advantageous Effects

An outer electrode active material structure according to one embodiment of the present disclosure has an advantage of increasing procedural efficiency in the battery fabrication and facilitating fault management because its structure is maintained by a porous polymer support and the support is made from polymer and is thus flexible in itself, to allow the separately produced outer electrode active material structure to be wound on an electrode assembly composed of a negative electrode and a separator.

Also, because an electrode slurry is coated on the porous polymer support, followed by a compression operation, electric contacts between an active material/a conductive material/a current collector may be improved, thereby improving the life characteristics of the battery.

Also, an outer current collector for a cable-type secondary battery according to one embodiment of the present disclosure may reduce a risk of a short circuit caused by the contact with an inner current collector and prevent an active material from being peeled off, because it is less susceptible to serious deformation such as crumpling or bending due to its shape characteristics when an excessive external force is applied.

DESCRIPTION OF THE DRAWINGS

The accompanying drawings illustrate preferred embodiments of the present disclosure and, together with the foregoing disclosure, serve to provide further understanding of the technical aspects of the present disclosure. However, the present disclosure is not to be construed as being limited to the drawings.

MODE FOR DISCLOSURE

Figure 1:
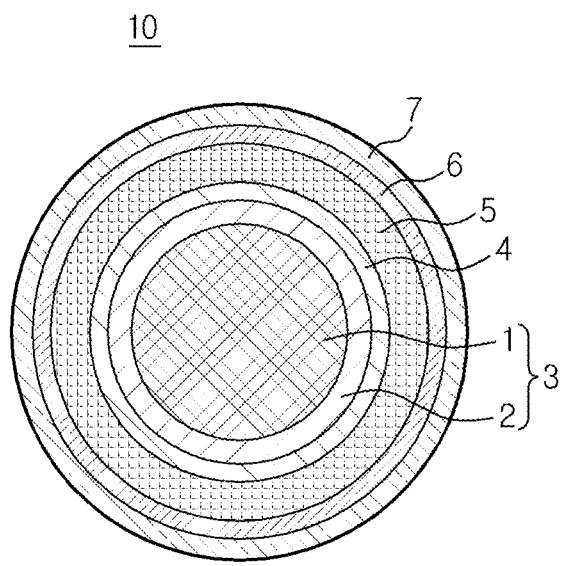
FIG. 1 is a cross-sectional view illustrating a cable-type secondary battery according to an exemplary embodiment of the present disclosure.

Hereinafter, the present disclosure will be described in detail with reference to the accompanying drawings. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Also, the configurations illustrated in the drawings and the embodiments are just preferable examples for the purpose of illustrations only, not intended to limit the scope of the disclosure, so it should be understood that other equivalents and modifications could be made thereto without departing from the scope of the disclosure.

According to one aspect of the present disclosure, there is provided a cable-type secondary battery including an inner electrode including an inner current collector and an inner electrode active material layer formed surrounding an outer surface of the inner current collector, a separation layer formed surrounding an outer surface of the inner electrode to insert the inner electrode inside, an outer electrode active material structure formed surrounding an outer surface of the separation layer to insert the separation layer inside, and including a porous polymer support and an outer electrode active material layer formed on at least one of an upper surface and a lower surface of the porous polymer support, and an outer electrode including an outer current collector formed surrounding the outer electrode active material structure to insert the outer electrode active material structure inside.

Referring to FIG. 1, the cable-type secondary battery 10 according to one embodiment of the present disclosure includes an inner electrode 3 including an inner current collector 1 and an inner electrode active material layer 2 formed surrounding an outer surface of the inner current collector 1, a separation layer 4 formed surrounding an outer surface of the inner electrode 3 to insert the inner electrode 3 inside, an outer electrode active material structure 5 formed surrounding an outer surface of the separation layer 4 to insert the separation layer 4 inside, and including an outer electrode active material layer (not shown) and a porous polymer support (not shown), and an outer current collector 6 formed surrounding the outer electrode active material structure to insert the outer electrode active material structure inside. Also, the cable-type secondary battery 10 may further include a protection coating 7 formed on an outer surface of the outer current collector 6.

The cable-type secondary battery 10 according to one embodiment of the present disclosure may have a horizontal cross section of a predetermined shape, and a linear structure extending in elongated form along a length-wise direction with respect to horizontal cross section.

The cable-type secondary battery 10 according to one embodiment of the present disclosure is flexible and thus freely shape-adaptable. Here, the predetermined shape is not limited to a particular shape, and may include any shape without damaging the essential feature of the present disclosure.

The inner electrode of the present disclosure includes the linear inner current collector 1 and the inner electrode active material layer 2 formed surrounding the outer surface of the inner current collector 1. Also, the separation layer 4 for preventing a short circuit of an electrode is formed surrounding the outer surface of the inner electrode to insert the inner electrode inside the separation layer.

On the outer surface of the separation layer 4, an outer electrode is formed.

Here, the outer electrode includes an outer electrode active material structure and an outer current collector formed on the outer electrode active material structure, in contact with the separation layer.

The outer electrode active material structure includes a porous polymer support and an outer electrode active material layer formed on at least one surface of an upper surface and a lower surface of the porous polymer support.

Figure 2:
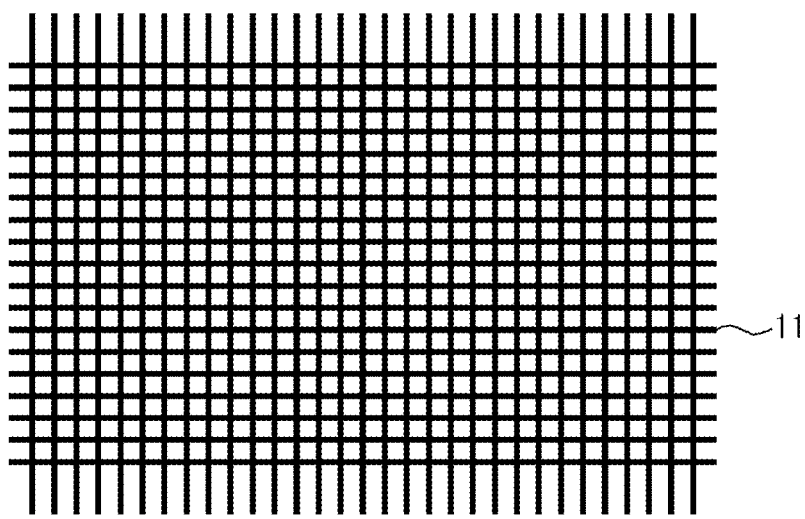
FIG. 2 is a diagram illustrating a porous polymer support according to an exemplary embodiment of the present disclosure.
Figure 3:
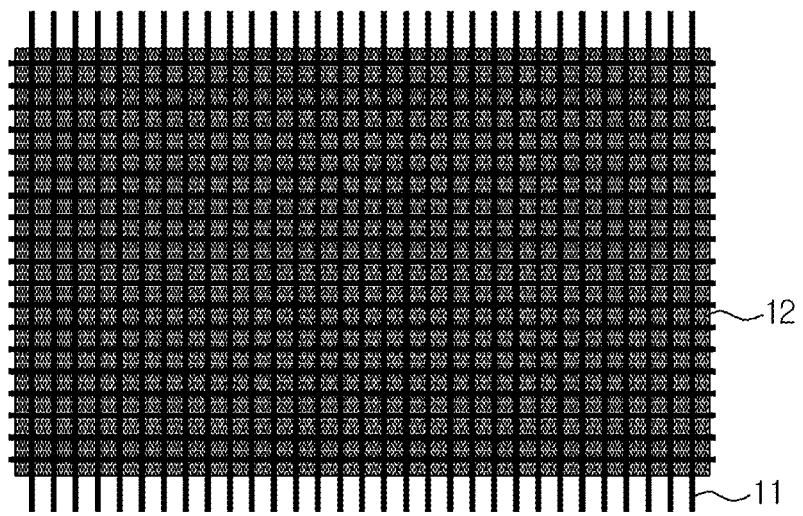
FIG. 3 is a diagram illustrating an outer electrode active material structure including a porous polymer support coated with an electrode active material slurry according to an exemplary embodiment of the present disclosure.

Referring to FIGS. 2 and 3, an outer electrode active material structure 20 may be made by preparing a porous polymer support 11 having a plurality of pores, coating a slurry containing an outer electrode active material on at least one of an upper surface and a lower surface of the porous polymer support 11, and drying it to form an outer electrode active material layer 12. As a result, the outer electrode active material layer may be formed on an outer surface such as an upper surface or a lower surface of polymer regions of the porous polymer support, and may be formed in the manner of filling pores defined by adjacent polymer regions apart from each other.

The porous polymer support may be a porous substrate or non-woven fabric made from a polymer selected from the group consisting of polyolefin; polyester, polyacetal, polyamide, polycarbonate, polyimide, polyether ether ketone, polyether sulfone, polyphenylene oxide, polyphenylene sulfide, and polyethylene naphthalate, but is not limited thereto.

Also, the porous polymer support may be a porous woven structure woven by interlacing weft with an average diameter of from 1 μm to 500 μm, or from 10 μm to 200 μm, and warp with an average diameter of from 1 μm to 500 μm, or from 10 μm to 200 μm, in which the weft passes over and under the warp.

The outer electrode active material structure may be wound on an inner electrode in a simple and convenient manner by various methods, the inner electrode including an inner current collector and an inner electrode active material layer formed surrounding an outer surface of the inner current collector.

Figure 4:
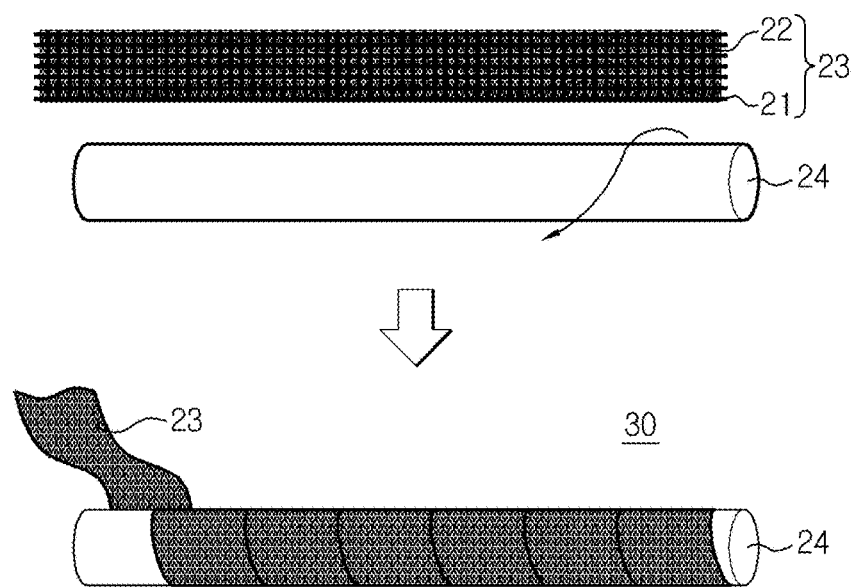
FIG. 4 is a diagram illustrating an example of implementation of diagonally winding an outer electrode active material structure on an inner electrode and a separation layer according to an exemplary embodiment of the present disclosure.
Figure 5:
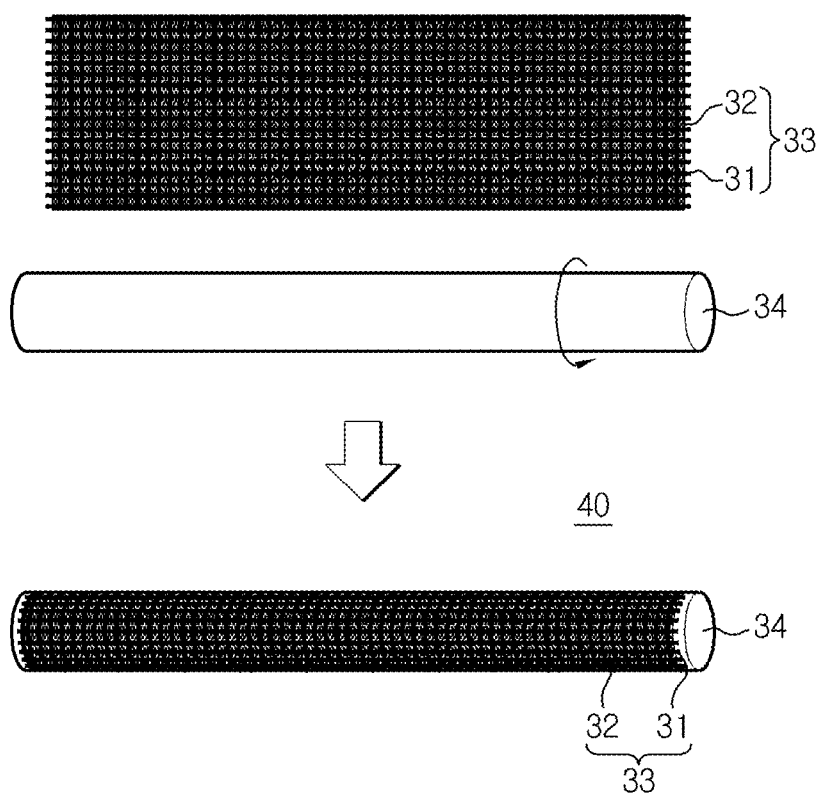
FIG. 5 is a diagram illustrating an example of implementation of winding an outer electrode active material structure on an inner electrode and a separation layer in a pipe form at a time.

Referring to FIGS. 4 and 5, outer electrode active material structures 23 and 33 include porous polymer supports 21 and 31 and outer electrode active material layers 22 and 32 formed on at least one surface of an upper surface and a lower surface of the porous polymer supports, respectively, and may be wound on an outer surface of an inner electrode with a separation layer, i.e., inner electrode/separation layer electrode assemblies 24 and 34. As a result, electrode assemblies 30 and 40 with the wound outer electrode active material structures may be produced.

Specifically, according to FIG. 4, the outer electrode active material structure 23 may be cut to have a predetermined width in a lengthwise direction, and then wound in a diagonal direction over the outer surface of the inner electrode/separation layer electrode assembly 24. In this instance, the outer electrode active material structure may be wound in a diagonal direction such that adjacent turns come into contact with no gaps, or adjacent turns overlap to some extent.

Also, according to FIG. 5, as opposed to FIG. 4, the outer electrode active material structure 33 may be wound over the outer surface of the inner electrode/separation layer electrode assembly 34 at a time by rolling in the form of a pipe.

In particular, in the case of winding in a diagonal direction, a resulting shape is similar to a spring structure as shown in FIG. 4, and thus, when bending is applied by an external force, it is less susceptible to structural deformation due to the external force, and stress applied to the electrode is low, resulting in good battery flexibility.

The cable-type secondary battery according to one embodiment of the present disclosure includes an inner electrode including an inner current collector and an inner electrode active material layer formed surrounding an outer surface of the inner current collector; a separation layer formed surrounding an outer surface of the inner electrode to insert the inner electrode inside; an outer electrode active material structure formed surrounding an outer surface of the separation layer to insert the separation layer inside, and including a porous polymer support and an outer electrode active material layer formed on at least one surface of an upper surface and a lower surface of the porous polymer support; and an outer electrode including an outer current collector formed surrounding the outer electrode active material structure to insert the outer electrode active material structure inside. Also, the cable-type secondary battery may further include a protection coating formed on an outer surface of the outer current collector.

The inner current collector may be a wire-type current collector or a current collector of an open structure, but is not limited thereto.

In this instance, the current collector of an open structure may be a hollow current collector having a space formed therein or a mesh-type current collector.

Also, the hollow current collector may include at least one wire-type inner current collector wound in a spiral pattern, or at least one sheet-type inner current collector wound in a spiral pattern. Further, the hollow current collector may include at least two wire-type inner current collectors spirally wound such that the wire-type inner current collectors intersect each other.

Further, within the space defined in the inner electrode, an inner electrode current collector core may be formed.

In this instance, the inner electrode current collector core may be made from carbon nanotube, stainless steel, aluminum, nickel, titanium, baked carbon or stainless steel surface-treated with copper; carbon, nickel, titanium or silver; an aluminum-cadmium alloy; non-conductive polymer surface-treated with a conductive material; or conductive polymer.

Also, within the space defined in the inner electrode, a lithium ion supply core including an electrolyte may be formed.

In this instance, the lithium ion supply core may include a gel polymer electrolyte and a support.

Also, the lithium ion supply core may include a liquid electrolyte and a porous carrier.

As described above, the current collector of an open structure such as a hollow current collector with an internal space or a mesh-type current collector may be equipped with a lithium ion supply core including an electrolyte in the internal space or the pores of the mesh-type current collector.

As a result, because the current collector of an open structure has an open structure, the electrolyte of the lithium ion supply core may reach the inner electrode active material layer and the outer electrode active material layer through the inner current collector. Accordingly, there is no need to excessively increase a thickness of an electrolyte layer, and rather an electrolyte layer is not used as an indispensable component and only a separator may be optionally used. That is, the cable-type secondary battery according to one embodiment of the present disclosure may include a lithium ion supply core including an electrolyte, and in this case, permeation into the active material in the electrode is made easy, facilitating the supply and exchange of lithium ions at the electrode, thus contributing to the improved capacity and cycle characteristics of the battery.

The lithium ion supply core includes an electrolyte, and the electrolyte is not limited to a particular type, but may include a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel polymer electrolyte using PEO, PVdF, PMMA, PAN or PVAC; or a solid electrolyte using PEO, polypropylene oxide (PPO), polyethylene imine (PEI), polyethylene sulphide (PES) or polyvinyl acetate (PVAc).

Additionally, the electrolyte may further include a lithium salt, and the lithium salt preferably includes LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate. Also, the lithium ion supply core may be only composed of an electrolyte, and in the case of a liquid electrolyte, a porous carrier may be used.

Also, within the space defined in the hollow current collector, a filling core may be formed.

The filling core may be formed from materials for the inner electrode current collector core and the lithium ion supply core described above as well as materials for improving various performance in the cable-type secondary battery, for example, a polymer resin, rubber, or inorganic matters, in various shapes, for example, in the shape of a wire, a fiber, powder, a mesh, or a foam.

The inner current collector is preferably made from stainless steel, aluminum, nickel, titanium, baked carbon, copper; stainless steel surface-treated with carbon, nickel, titanium or silver; an aluminum-cadmium alloy; a non-conductive polymer surface-treated with a conductive material; or a conductive polymer, and the outer current collector of an open structure is preferably made from stainless steel, aluminum, nickel, titanium, baked carbon, copper; stainless steel surface-treated with carbon, nickel, titanium or silver; an aluminum-cadmium alloy; a non-conductive polymer surface-treated with a conductive material; a conductive polymer; a metal paste including metal powder, for example, Ni, Al, Au, Ag, Al, Pd/Ag, Cr, Ta, Cu, Ba or ITO; or a carbon paste including carbon powder, for example, graphite, carbon black or carbon nanotube.

A current collector serves to collect electrons generated by an electrochemical reaction of an active material or to supply electrons required for an electrochemical reaction, and generally, a metal such as copper or aluminum is used. Especially, those using a non-conductive polymer treated with a conductive material on the surface thereof or a polymer conductive material comprising a conductive polymer has a relatively better flexibility than those using a metal such as copper or aluminum. Also, a lightweight battery may be achieved by using a polymer current collector in place of a metal current collector.

The conductive material includes polyacetylene, polyaniline, polypyrrole, polythiophene, polysulfurnitride, indium tin oxide (ITO), silver, palladium, and nickel, and the conductive polymer includes polyacetylene, polyaniline, polypyrrole, polythiophene, and polysulfurnitride. However, the non-conductive polymer used for the current collector is not limited to a particular type.

According to one embodiment of the present disclosure, in connection with a structure in which the inner electrode active material layer is formed on the entire surface of a wire-type inner current collector, before a wire-type inner current collector is wound on the outer surface of the lithium ion supply core, an inner electrode active material layer may be formed in advance on the surface of the wire-type inner current collector, or at least two wire-type inner current collectors having an inner electrode active material layer formed on the surface thereof may be wound with the wire-type inner current collectors intersecting each other. Like this, when at least two wire-type inner current collectors are wound together, it is advantageous for improvement in battery rate characteristics.

Further, in connection with a structure in which the inner electrode active material layer is formed surrounding an outer surface of a wound inner current collector, after an inner current collector is wound on the outer surface of the lithium ion supply core, an inner electrode active material layer may be formed surrounding the outer surface of the wound inner current collector.

In this instance, the inner electrode may further include a polymer support layer formed on the surface of the inner electrode active material layer.

When the polymer support layer is further present on the surface of the inner electrode active material layer according to one embodiment of the present disclosure, a phenomenon in which a crack occurs on the surface of the inner electrode active material layer is effectively prevented where a wire-type inner electrode is employed in a wound form as the inner electrode or even if bending occurs in the cable-type secondary battery due to an external force. Thereby, a peel-off phenomenon of the inner electrode active material layer may be prevented, and the battery performance may be further improved. Further, the polymer support layer may have a porous structure, and in this instance, penetration of an electrolyte solution into the inner electrode active material layer is facilitated, thereby preventing an increase in electrode resistance.

Here, the polymer support layer may include a polar linear polymer, an oxide-based linear polymer, or mixtures thereof.

In this instance, the polar linear polymer may be any one selected from the group consisting of polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, and poly-p-phenylene terephthalamide, or mixtures thereof.

Also, the oxide-based linear polymer may be any one selected from the group consisting of polyethylene oxide, polypropylene oxide, polyoxymethylene, and polydimethylsiloxane, or mixtures thereof.

Also, the polymer support layer may be a porous polymer layer having a pore size of from 0.01 μm to 10 μm and porosity of from 5% to 95%.

Also, the porous structure of the porous polymer layer may be formed through phase separation or phase transition by a non-solvent during its production process.

As an example, polymer such as polyvinylidene fluoride-co-hexafluoro propylene is added to acetone acting as a solvent to prepare a solution with solid content of 10 weight %. Subsequently, water or ethanol as a non-solvent is added to the prepared solution in an amount of from 2 weight % to 10 weight % to prepare a polymer solution.

The phase transition occurs during evaporation after the polymer solution is coated, and among phase separated regions of the non-solvent and the polymer, regions occupied by the non-solvent become pores. Thus, a pore size may be controlled based on an extent of solubility of the non-solvent and the polymer and a content of the non-solvent.

The inner electrode may be a negative electrode or a positive electrode, and the outer electrode may be a positive electrode or a negative electrode opposite to the inner electrode.

The electrode active material layer of the present disclosure acts to transport ions through the current collector, and the migration of the ions is caused by interaction through intercalation/deintercalation of ions from/into the electrolyte layer.

The electrode active material layer may be classified into a negative electrode active material layer and a positive electrode active material layer.

Specifically, where the inner electrode is a negative electrode and the outer electrode is a positive electrode, the inner electrode active material layer which is a negative electrode active material layer may include any one active material particle selected from the group consisting of natural graphite, artificial graphite, carbonaceous materials; lithium-containing titanium composite oxide (lithium titanium oxide; LTO), metals (Me) such as Si, Sn, Li, Zn, Mg, Cd, Ce, Ni or Fe; alloys composed of the metals (Me); oxides (MeOx) of the metals (Me); and composites of the metals (Me) and carbon, or mixtures thereof, and the outer electrode active material layer which is a positive electrode active material layer may include any one active material particle selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (each of M1 and M2 is independently any one selected from the group consisting of Al, Ni, Co, Fe, Mn, V, Cr, Ti, W, Ta, Mg and Mo, and x, y and z are, independently, atomic fractions of elements in an oxide composition in which $0 \leq x < 0.5$, $0 \leq y < 0.5$, $0 \leq z < 0.5$, $x+y+z \leq 1$), or mixtures thereof.

Also, when the inner electrode is a positive electrode and the outer electrode is a negative electrode, the inner electrode active material layer may be a positive electrode active material layer and the outer electrode active material layer may be a negative electrode active material layer.

The separation layer of the present disclosure may comprise an electrolyte layer or a separator.

The electrolyte layer serving as an ion channel may include a gel polymer electrolyte using PEO, PVdF, PVdF-HFP, PMMA, PAN or PVAC, or a solid electrolyte using PEO, polypropylene oxide (PPO), polyethylene imine (PEI), polyethylene sulphide (PES) or polyvinyl acetate (PVAc). The matrix of the solid electrolyte preferably comprises a polymer or a ceramic glass as a backbone. In a case of typical polymer electrolytes, ions move very slowly in terms of a reaction rate, even when the ionic conductivity is satisfied. Thus, the gel polymer electrolyte which facilitates the movement of ions is preferably used as compared to the solid electrolyte. The gel polymer electrolyte has poor mechanical properties and thus may comprise a porous support or a cross-linked polymer to improve the poor mechanical properties. The electrolyte layer of the present disclosure can serve as a separator, and thus the use of a separate separator may be omitted.

The electrolyte layer of the present disclosure may further include a lithium salt. The lithium salt can improve the ionic conductivity and a reaction rate, and its non-limiting examples include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

The separator is not limited to a particular type, but may include a porous substrate made from a polyolefin-based polymer selected from the group consisting of ethylene homopolymers, propylene homopolymers, ethylene-butene copolymers, ethylene-hexene copolymers, and ethylene-methacrylate copolymers; a porous substrate made from a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; or a porous substrate made from a mixture of inorganic particles and a binder polymer.

The outer current collector according to one embodiment of the present disclosure is not limited to a particular type, but may include a pipe-type current collector, a wound wire-type current collector, a wound sheet-type current collector, or a mesh-type current collector.

Also, the outer current collector may be made from stainless steel; aluminum; nickel; titanium; baked carbon; copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powder of Ni, Al, Au, Ag, Al, Pd/Ag, Cr, Ta, Cu, Ba or ITO; or a carbon paste comprising carbon powder of graphite, carbon black or carbon nanotube.

In the case of the wound wire-type current collector, the wound sheet-type current collector, or the mesh-type current collector, it has an open structure, and this open structure refers to a structure in which the open structure serves as a boundary surface through which a substance may be transferred freely from the inside of the structure to the outside thereof. Also, the outer current collector of an open structure is not limited to a wound wire-type current collector, a wound sheet-type current collector, or a mesh-type current collector.

The outer current collector having an open structure has elasticity due to its shape and serves to enhance the flexibility of the entire cable-type secondary battery. Also, when excessive external force is applied to the cable-type secondary battery of the present disclosure, the outer current collector of an open structure according to the present disclosure undergoes little serious deformation such as crumpling or bending due to its shape characteristics, so concerns about a short circuit caused by a contact with the inner current collector may be reduced.

The electrode active material layer includes an electrode active material, a binder and a conductive material, and is bonded to the current collector to form an electrode. When the electrode is deformed by bending or severely folding due to external force, the electrode active material may be released. The release of the electrode active material results in a reduction in performance and capacity of the battery. However, the outer current collector of an open structure having elasticity functions to disperse the applied force when such a deformation occurs by the external force, so the active material layer is less deformed, thus preventing the active material from being released.

The cable-type secondary battery according to one embodiment of the present disclosure includes a protection coating, and the protection coating corresponds to an insulator and is formed on the outer surface of the outer electrode to protect the electrode from moisture in the air and external impacts. As the protection coating, a conventional polymer resin including a moisture barrier layer may be used, and the polymer resin includes, for example, PET, PVC, HDPE, or an epoxy resin, and the moisture barrier layer includes aluminum or liquid crystal polymer with good moisture barrier performance.

Figure 6:
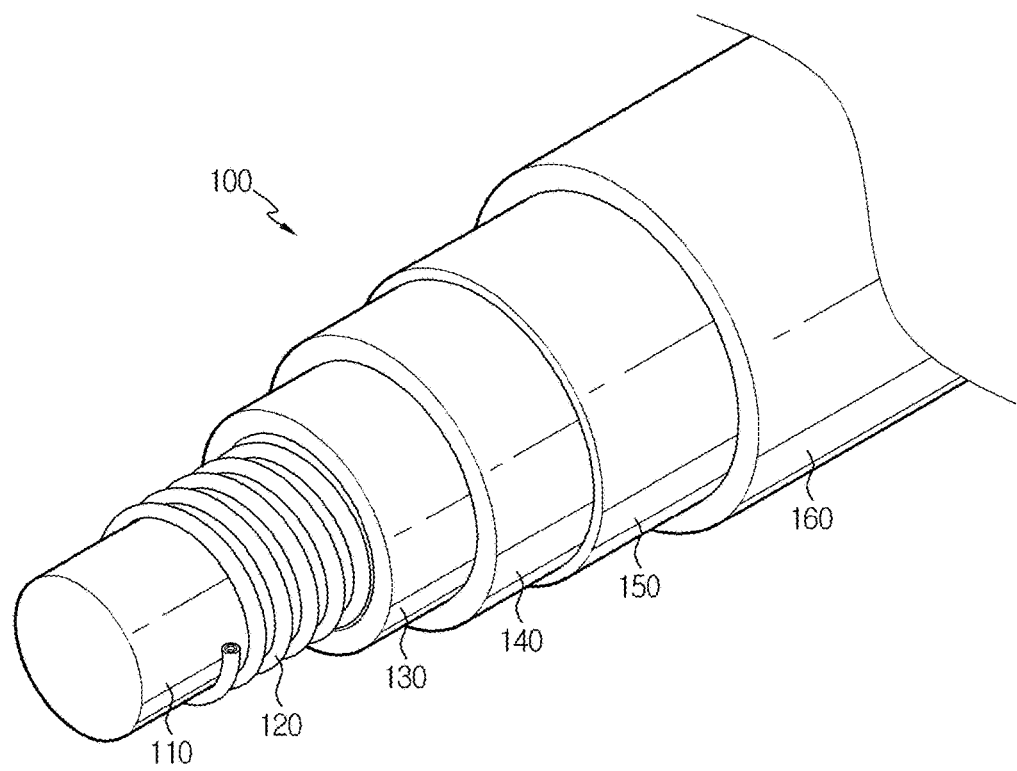
FIG. 6 is a cross-sectional view illustrating a cable-type secondary battery according to an exemplary embodiment of the present disclosure.

Referring to FIG. 6, the cable-type secondary battery 100 employing an inner current collector of an open structure according to one embodiment of the present disclosure includes a lithium ion supply core 110; an inner electrode including an inner current collector 120 of an open structure formed surrounding an outer surface of the lithium ion supply core 110, the inner current collector being a wound wire-type current collector, and an inner electrode active material layer 130 formed surrounding an outer surface of the current collector; a separation layer 140 formed surrounding an outer surface of the inner electrode to insert the inner electrode inside; and an outer electrode active material structure 150 formed surrounding an outer surface of the separation layer 140 to insert the separation layer inside, the outer electrode active material structure including an outer electrode active material layer (not shown) and a porous polymer support (not shown); and an outer current collector 160 formed surrounding the outer electrode active material structure 150 to insert the outer electrode active material structure inside. Also, to prevent a short circuit of the electrode, separation layers 130 and 230 are formed surrounding the outer surface of the inner electrode to insert the inner electrode into the separation layer.

Hereinafter, the cable-type secondary battery according to one embodiment and its manufacturing method is briefly described with reference to FIG. 1.

The cable-type secondary battery 10 according to one embodiment includes an inner electrode 3 including an inner current collector 1 and an inner electrode active material layer 2 formed surrounding an outer surface of the inner current collector 1; a separation layer 4 formed surrounding an outer surface of the inner electrode 3 to insert the inner electrode 3 inside; an outer electrode active material structure 5 formed surrounding an outer surface of the separation layer 4 to insert the separation layer 4 inside, the outer electrode active material support including an outer electrode active material layer (not shown) and a porous polymer support (not shown); and an outer current collector 6 formed surrounding the outer electrode active material structure to insert the outer electrode active material structure inside. Also, the cable-type secondary battery may further include a protection coating 7 formed on an outer surface of the outer current collector 6.

First, a wire-type inner current collector 1 is prepared, and an inner electrode active material layer 2 is formed on the surface of the inner current collector 1 by coating. The coating method includes a general coating method, particularly, electroplating or an anodic oxidation process, however to maintain a uniform interval, it is preferred to use a method which discontinuously extrusion-coats an electrode slurry including an active material through an extruder. Also, in the case of an electrode slurry including an active material, dip coating or a method of extrusion coating using an extruder may be contemplated.

Subsequently, a separation layer 3 is formed surrounding the inner electrode active material layer 2, and the separation layer 3 is an electrolyte layer. A method of forming the separation layer 3 which is an electrolyte layer is not particularly limited, but extrusion coating is easy to form the separation layer 3 due to the characteristics of the cable-type secondary battery in a linear shape. Also, where the separation layer 3 is used as a separator, the inner electrode, it may be formed by winding the separator around the inner electrode.

An outer electrode active material structure 5 which will be wound on the outer surface of the separation layer 3 as an electrolyte layer is prepared, the outer electrode active material structure 5 including an outer electrode active material layer and a porous polymer support.

The outer electrode active material structure 5 may be made by coating a slurry including an outer electrode active material and a dispersant onto at least one of an upper surface and a lower surface of a porous polymer support having a plurality of pores, and drying it to form an outer electrode active material layer. A method of coating the outer electrode active material slurry includes a coating method using dip coating, a comma coater, or a slot die coater.

Subsequently, a method of winding the resulting outer electrode active material structure 5 on the outer surface of the separation layer 4 is not particularly limited, but as described above, the outer electrode active material structure 5 may be cut to have a predetermined width in a lengthwise direction, and then wound on the outer surface of the separation layer in a diagonal direction or wound on the outer surface of the separation layer at a time by rolling in the form of a pipe.

Also, an outer current collector 6 such as a pipe-type current collector, a wound wire-type current collector, a wound sheet-type current collector, or a mesh-type current collector is formed on the outer surface of the outer electrode active material structure 5.

Finally, a protection coating 7 is formed on the outer surface of the outer current collector 6. The protection coating 7 corresponds to an insulator and is formed on the outermost surface to protect the electrode from moisture in the air and external impact. As the protection coating 7, a conventional polymer resin including a moisture barrier layer may be used, and the polymer resin includes, for example, PET, PVC, HDPE, or an epoxy resin, and the moisture barrier layer includes aluminum or liquid crystal polymer with good moisture barrier performance.

As described above, the cable-type secondary battery according to one embodiment of the present disclosure has the outer electrode active material structure of a type of a sheet-type electrode by including the outer electrode active material layer on at least one surface of the porous polymer support. Thus, the outer electrode active material structure may maintain its structure by the porous polymer support, and because the porous polymer support itself is flexible as a polymer, the outer electrode may be formed by winding the produced electrode on an outer surface of an electrode assembly including the inner electrode and the separation layer.

As a result, after the outer electrode active material slurry is coated on the porous polymer support, a press operation may be performed, thereby preventing the separation of an electrical contact of an electrode and consequently deterioration in battery life that has been caused by a failure to perform a press operation on an electrode when an outer electrode active material is coated on a linear battery according to a related art. Further, it is possible to solve the problem, for example, melting and oozing of coating layers of an inner electrode and a separation layer (for example, a polymer electrolyte layer, etc.) and a consequential short circuit by an organic solvent such as N-methyl pyrrolidone included in an outer electrode active material slurry when an electrode assembly including the inner electrode and the separation layer is produced and an outer electrode active material is coated thereon according to the related art.

In addition, as opposed to the related art, when each of an inner electrode and an outer electrode is independently produced and then combined with each other, efficiency of an electrode production process may be improved and fault management may be facilitated.

Hereinafter, another contemplated embodiment is described with reference to FIG. 7.

Figure 7:
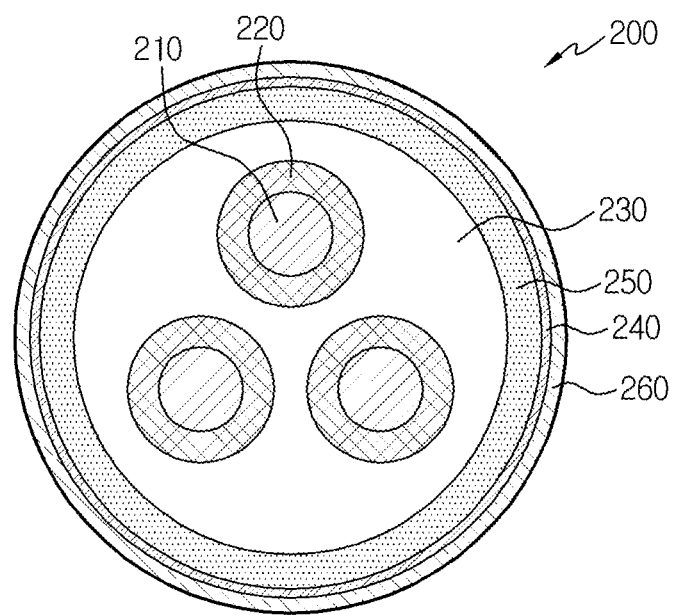
FIG. 7 is a cross-sectional view illustrating a cable-type secondary battery having a plurality of inner electrodes according to an exemplary embodiment of the present disclosure.

Referring to FIG. 7, the cable-type secondary battery 200 according to one embodiment of the present disclosure includes at least two inner electrodes arranged parallel to each other, each inner electrode including an inner current collector 210 and an inner electrode active material layer 220 formed surrounding an outer surface of an inner current collector 210; a separation layer 230 formed surrounding outer surfaces of the at least two inner electrodes to insert the inner electrodes inside to prevent a short circuit of the inner electrodes; an outer electrode active material structure 250 formed surrounding an outer surface of the separation layer 230 to insert the separation layer inside, the outer electrode active material structure including a porous polymer support and an outer electrode active material layer formed on at least one surface of an upper surface and a lower surface of the porous polymer support; and an outer electrode including an outer current collector 240 formed surrounding the outer electrode active material structure to insert the outer electrode active material structure inside.

As the cable-type secondary battery 200 has the inner electrode composed of a plurality of electrodes, an amount of the electrode layer loaded and the battery capacity may be easily controlled by adjusting a number of the inner electrodes, and because a plurality of electrodes is provided, the likelihood of a short circuit may be reduced.

Also, in the cable-type secondary battery having the plurality of inner electrodes, the inner electrodes may employ a wire-type current collector or a current collector of an open structure.

In this instance, as described above, the current collector of an open structure employed in the plurality of inner electrodes may be also a hollow current collector having a space formed therein or a mesh-type current collector, and the hollow current collector may include at least one wire-type inner current collector wound in a spiral pattern, or at least one sheet-type inner current collector wound in a spiral pattern.

Hereinafter, the present disclosure will be described in detail through embodiments. The embodiments of the present disclosure, however, may take several other forms, and the scope of the present disclosure should not be construed as being limited to the following embodiments. The embodiments of the present disclosure are provided to more fully explain the present disclosure to those having ordinary knowledge in the art to which the present disclosure pertains.

EXAMPLE (1) Production of a Positive Electrode

A positive electrode active material slurry including 80 wt % of $LiCoO_2$ as a positive electrode active material, 5 wt % of Denka black as a conductive material, and 15 wt % of PVDF as a binder dispersed in a N-methylpyrrolidone (NMP) solvent is coated onto one surface of a PET non-woven fabric as a porous polymer support, and dried to produce a positive electrode active material structure, and Au or Pt as a positive electrode current collector is formed on an upper surface of the positive electrode active material structure by a sputtering method to produce a sheet-type positive electrode for a secondary battery.

(2) Fabrication of a Half Coin Cell

An electrode assembly was produced using the sheet-type positive electrode for a secondary battery produced as above, with a polyethylene porous film as a separator interposed between the positive electrode and a negative electrode made from a lithium foil. After the electrode assembly was put in a battery case, an electrolyte solution was injected in which 1M LiPF6 is added in a non-aqueous solvent including a mixture of ethylene carbonate and diethyl carbonate at a volume ratio of 1:2, to fabricate a half coin cell.

Comparative Example (1) Production of a Positive Electrode

A positive electrode material slurry including 80 wt % of $LiCoO_2$ as a positive electrode active material, 5 wt % of Denka black as a conductive material, and 15 wt % of PVDF as a binder dispersed in a N-methylpyrrolidone (NMP) solvent was coated onto one surface of a sheet-type current collector made from an aluminum foil, and dried to produce a positive electrode.

(2) Fabrication of a Half Coin Cell

A half coin cell was fabricated by the same method as Example except the positive electrode produced above was used.

Electrode Bending Test

After the positive electrodes produced in Example and Comparative example were folded in half, their shape was observed.

Figure 8:
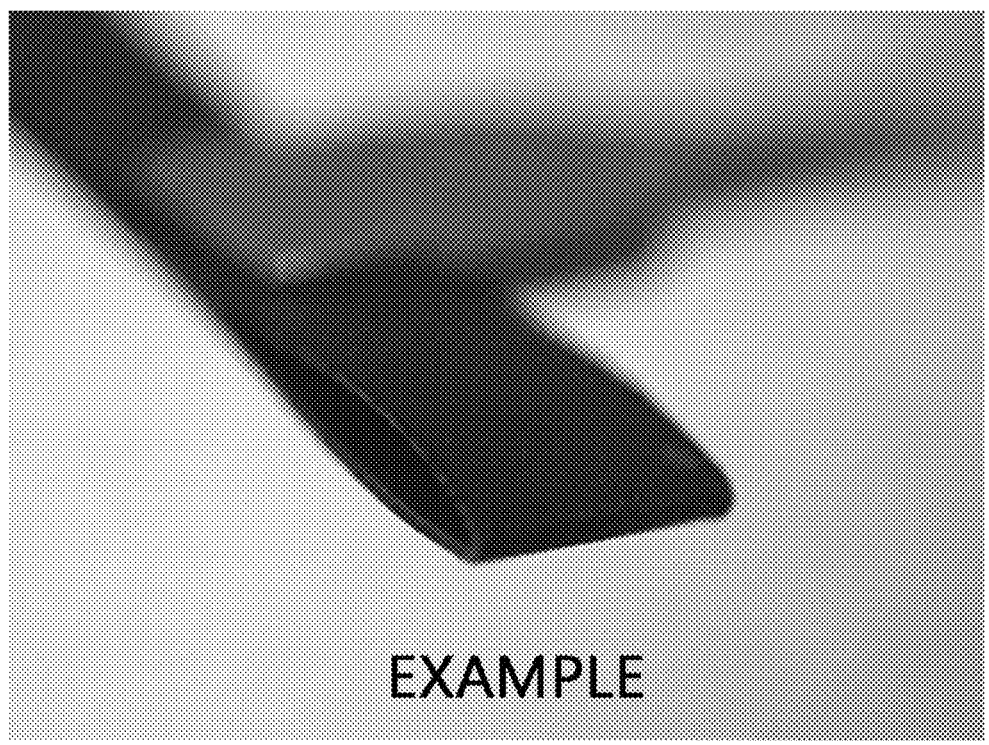
FIGS. 8 and 9 are photographic images illustrating each positive electrode produced according to example and comparative example after being folded in half.
Figure 9:
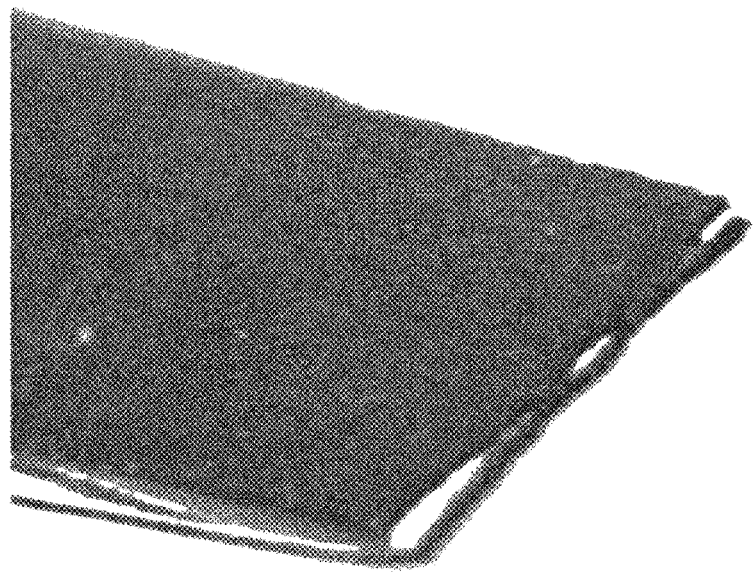

FIGS. 8 and 9 are photographic images illustrating each positive electrode produced according to Example and Comparative example after being folded in half.

In the case of Comparative example, it was found that the electrode was broken and serious cracking occurred, while in the case of Example, cracking did not occur and the PET non-woven fabric as a porous polymer support held the positive active material layer well. Through this, it can be seen that flexibility of the positive electrode was significantly improved.

Evaluation of Charge/Discharge Characteristics

The charge/discharge characteristics were evaluated using the half coin cells fabricated in Example and Comparative example. While charging, constant current charge was done with a current density of 0.5 C up to 4.25V, and after uniformly maintaining a constant voltage up to 4.25V, was completed when the current density reaches 0.005 C. While discharging, discharge was completed with a current density of 0.5 C up to 3.0V in a constant current mode. The repeated charge and discharge was done 30 cycles under the same condition.

Figure 10:
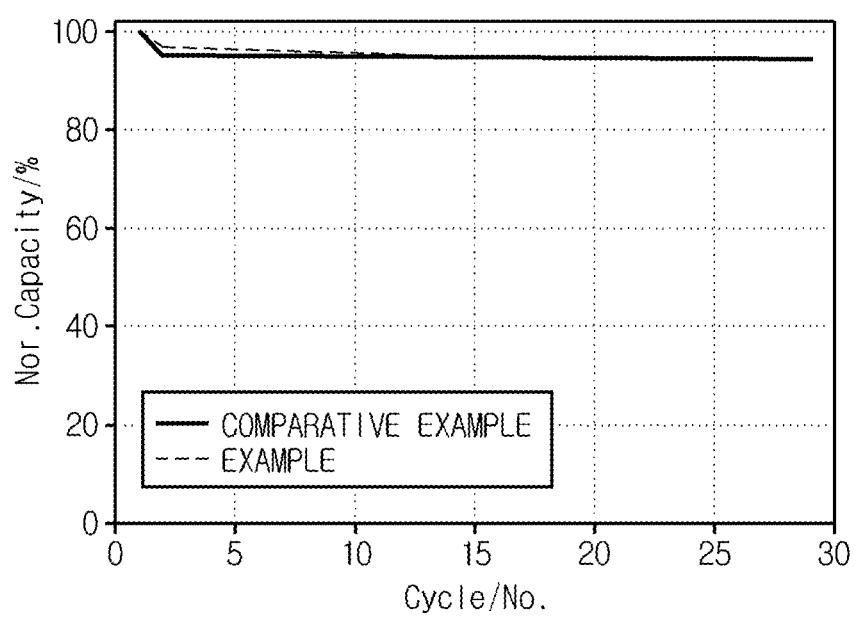
FIG. 10 is a graph illustrating life characteristics of half coin cells fabricated in example and comparative example.

FIG. 10 is a graph illustrating life characteristics of half coin cells fabricated in Example and Comparative example. It can be seen that Example exhibits almost similar life characteristics in battery performance when compared to Comparative example, and through this, it is found that through introduction of a porous polymer support, similar battery performance to existing one may be provided and concurrently electrode flexibility may be greatly improved.

DESCRIPTION OF REFERENCE NUMERALS 10, 100, 300: Cable-type secondary battery
1, 110, 210: Inner current collector
2, 120, 220: Inner electrode active material layer
4, 130, 230: Separation layer
5, 23, 33, 140, 250: Outer electrode active material structure
6, 150, 240: Outer current collector
7, 160, 260: Protection coating
11, 21, 31: Porous polymer support
12, 22, 32: Outer electrode active material layer
24, 34: Inner electrode/separation layer electrode assembly
30, 40: Electrode assembly with wound outer electrode active material structure

What is claimed is:
1. A cable-type secondary battery comprising:
an inner electrode comprising an inner current collector and an inner electrode active material layer formed surrounding an outer surface of the inner current collector;
a separation layer formed surrounding an outer surface of the inner electrode to insert the inner electrode inside;

an outer electrode active material structure formed surrounding an outer surface of the separation layer to insert the separation layer inside, the outer electrode active material structure comprising a porous polymer support and an outer electrode active material layer formed on at least one of an upper surface and a lower surface of the porous polymer support; and an outer electrode comprising an outer current collector formed surrounding the outer electrode active material structure to insert the outer electrode active material structure inside.

2. The cable-type secondary battery according to claim 1, wherein the inner current collector is a wire-type current collector or a current collector of an open structure.

3. The cable-type secondary battery according to claim 2, wherein the current collector of an open structure is a hollow current collector having a space formed therein, or a mesh-type current collector.

4. The cable-type secondary battery according to claim 3, wherein the hollow current collector comprises at least one wire-type inner current collector wound in a spiral pattern, or at least one sheet-type inner current collector wound in a spiral pattern.

5. The cable-type secondary battery according to claim 4, wherein the hollow current collector comprises at least two wire-type inner current collectors wound in a spiral pattern such that the wire-type inner current collectors intersect.

6. The cable-type secondary battery according to claim 3, wherein the space formed in the hollow current collector has an inner electrode current collector core, a lithium ion supply core including an electrolyte, or a filling core formed therein.

7. The cable-type secondary battery according to claim 6, wherein the inner electrode current collector core is made from carbon nanotube; stainless steel; aluminum; nickel; titanium; baked carbon; copper; stainless steel surface-treated with carbon, nickel, titanium or silver; an aluminum-cadmium alloy; a non-conductive polymer surface-treated with a conductive material; or a conductive polymer.

8. The cable-type secondary battery according to claim 6, wherein the lithium ion supply core includes a gel polymer electrolyte and a support.

9. The cable-type secondary battery according to claim 6, wherein the lithium ion supply core includes a liquid polymer electrolyte and a porous carrier.

10. The cable-type secondary battery according to claim 6, wherein the electrolyte includes an electrolyte selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN or PVAc; and a solid electrolyte using PEO, polypropylene oxide (PPO), polyethylene imine (PEI), polyethylene sulphide (PES), or polyvinyl acetate (PVAc).

11. The cable-type secondary battery according to claim 6, wherein the electrolyte further comprises a lithium salt.

12. The cable-type secondary battery according to claim 11, wherein the lithium salt is any one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate, or mixtures thereof.

13. The cable-type secondary battery according to claim 6, wherein the filling core comprises a polymer resin, rubber, or inorganic matters in a shape of a wire, a fiber, powder, a mesh, or a foam.

14. The cable-type secondary battery according to claim 1, wherein the inner current collector is made from stainless steel; aluminum; nickel; titanium; baked carbon; copper; stainless steel surface-treated with carbon, nickel, titanium or silver; an aluminum-cadmium alloy; a non-conductive polymer surface-treated with a conductive material; or a conductive polymer.

15. The cable-type secondary battery according to claim 14, wherein the conductive material is any one selected from polyacetylene, polyaniline, polypyrrole, polythiophene, polysulfurnitride, indium tin oxide (ITO), silver, palladium, and nickel, or mixtures thereof.

16. The cable-type secondary battery according to claim 14, wherein the conductive polymer is a polymer of any one compound selected from polyacetylene, polyaniline, polypyrrole, polythiophene, and polysulfurnitride, or mixtures thereof.

17. The cable-type secondary battery according to claim 1, wherein the porous polymer support is a porous substrate or non-woven fabric made from a polymer selected from the group consisting of polyolefin, polyester, polyacetal, polyamide, polycarbonate, polyimide, polyether ether ketone, polyether sulfone, polyphenylene oxide, polyphenylene sulfide, and polyethylene naphthalate.

18. The cable-type secondary battery according to claim 17, wherein the porous substrate is a porous woven structure woven by interlacing warp and weft while the weft passes over and under the warp, each of the warp and the weft having an average diameter of from 10 μm to 200 μm.

19. The cable-type secondary battery according to claim 1, wherein the porous polymer support is wound on the outer surface of the separation layer in a diagonal direction, or is wound on the outer surface of the separation layer at a time in a form of a pipe.

20. The cable-type secondary battery according to claim 1, wherein the outer current collector is a pipe-type current collector, a wound wire-type current collector, a wound sheet-type current collector, or a mesh-type current collector.

21. The cable-type secondary battery according to claim 1, wherein the outer current collector is made from stainless steel; aluminum; nickel; titanium; baked carbon; copper; stainless steel surface-treated with carbon, nickel, titanium or silver; an aluminum-cadmium alloy; a non-conductive polymer surface-treated with a conductive material; a conductive polymer; a metal paste comprising metal powder of Ni, Al, Au, Ag, Al, Pd/Ag, Cr, Ta, Cu, Ba or ITO; or a carbon paste comprising carbon powder of graphite, carbon black or carbon nanotube.

22. The cable-type secondary battery according to claim 1, wherein the inner electrode is a negative electrode or a positive electrode, and the outer electrode is a positive electrode or a negative electrode, opposite to the inner electrode.

23. The cable-type secondary battery according to claim 1, wherein the separation layer is an electrolyte layer or a separator.

24. The cable-type secondary battery according to claim 23, wherein the electrolyte layer comprises a gel polymer electrolyte using PEO, PVdF, PVdF-HFP, PMMA, PAN or PVAC; and a solid electrolyte using PEO, polypropylene oxide (PPO), polyethylene imine (PEI), polyethylene sulphide (PES), or polyvinyl acetate (PVAc).

25. The cable-type secondary battery according to claim 23, wherein the electrolyte layer further comprises a lithium salt.

26. A cable-type secondary battery comprising:
at least two inner electrodes arranged parallel to each other, each inner electrode comprising an inner current collector and an inner electrode active material layer formed surrounding an outer surface of the inner current collector;
a separation layer formed surrounding outer surfaces of the at least two inner electrodes to insert the inner electrodes inside;
an outer electrode active material structure formed surrounding an outer surface of the separation layer to insert the separation layer inside, the outer electrode active material structure comprising a porous polymer support and an outer electrode active material layer formed on at least one of an upper surface and a lower surface of the porous polymer support; and
an outer electrode comprising an outer current collector formed surrounding the outer electrode active material structure to insert the outer electrode active material structure inside.

27. The cable-type secondary battery according to claim 26, wherein the inner current collector is a wire-type current collector or a current collector of an open structure.

28. The cable-type secondary battery according to claim 27, wherein the current collector of an open structure is a hollow current collector having a space formed therein, or a mesh-type current collector.

29. The cable-type secondary battery according to claim 28, wherein the hollow current collector comprises at least one wire-type inner current collector wound in a spiral pattern, or at least one sheet-type inner current collector wound in a spiral pattern.

* * * * *